(12) United States Patent
Hwang et al.

(10) Patent No.: US 7,126,815 B2
(45) Date of Patent: Oct. 24, 2006

(54) MONITOR (75) Inventors: Kwang-sung Hwang, Suwon-si (KR); Kyung-kyun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 302 days.

(21) Appl. No.: 10/878,036

(22) Filed: Jun. 29, 2004

(65) Prior Publication Data
US 2005/0201046 A1 Sep. 15, 2005

(30) Foreign Application Priority Data
Mar. 12, 2004 (KR) ................ 10-2004-0016984

(51) Int. Cl.
G06F 1/16 (2006.01)
F16M 11/00 (2006.01)
G02F 1/1333 (2006.01)
H05K 5/00 (2006.01)

(52) U.S. Cl. .................. 361/681; 345/58; 248/157

(58) Field of Classification Search ........... 361/681; 349/58; 248/157, 176.1, 371, 917–924
See application file for complete search history.

(56) References Cited

U.S. PATENT DOCUMENTS

| | | | |
|---|---|---|---|
| 6,168,124 B1 * | 1/2001 | Matsuoka et al. | 248/176.1 |
| 6,229,584 B1 * | 5/2001 | Chuo et al. | 349/58 |
| 6,437,975 B1 | 8/2002 | Huang | |
| 6,816,364 B1 * | 11/2004 | Helot et al. | 361/681 |
| 6,961,234 B1 * | 11/2005 | Tanaka et al. | 361/681 |
| 7,014,154 B1 * | 3/2006 | Jeong et al. | 248/157 |
| 2003/0227739 A1 * | 12/2003 | Kim et al. | 361/681 |
| 2004/0211866 A1 * | 10/2004 | Jung et al. | 248/133 |
| 2005/0088808 A1 * | 4/2005 | Michoux et al. | 361/681 |
| 2006/0132360 A1 * | 6/2006 | Caimi et al. | 343/700 MS |

FOREIGN PATENT DOCUMENTS

| | | |
|---|---|---|
| JP | 1998-275028 | 10/1998 |
| JP | 11-184393 | 7/1999 |
| KR | 2000-20280 | 12/2000 |
| KR | 2001-56960 A | 7/2001 |
| KR | 2002-62624 | 7/2002 |
| KR | 2003-33662 | 5/2003 |

OTHER PUBLICATIONS

International Search Report (International application No. PCT/KR2004/001592) filed on Jun. 30, 2004.

* cited by examiner

*Primary Examiner*—Lisa Lea-Edmonds
(74) *Attorney, Agent, or Firm*—Stanzione & Kim, LLP (57) ABSTRACT

A monitor having a main body displaying a picture, and a base supporting the main body, may further include: a link provided between the main body and the base; a monitor hinge interposed between the main body and the link, and pivotally supporting the main body relative to the base; a base hinge interposed between the base and the link, and pivotally supporting the base relative to the link; a cable having a first portion accommodated inside the link and a second portion exposed to the outside to transmit an external signal there throught; and a terminal assembly provided inside the link, and having a connection terminal to which the cable is connected, and a connection terminal supporter supporting the connection terminal. With this configuration, a monitor in which a terminal assembly and a cable are accommodated inside a link is provided, thereby enhancing space utilization and providing a cool outer appearance thereof.

20 Claims, 6 Drawing Sheets

MONITOR

CROSS-REFERENCE TO RELATED APPLICATIONS

This application claims the benefit of Korean Patent Application No. 2004-16984, filed Mar. 12, 2004, in the Korean Intellectual Property Office, the disclosure of which is incorporated herein by reference.

BACKGROUND OF THE INVENTION

1. Field of the Invention

The present general inventive concept relates to a monitor, and more particularly, to a monitor having an improved structure of a link to accommodate a part of a cable and a terminal assembly connected to the cable.

2. Description of the Related Art

Figure 1:
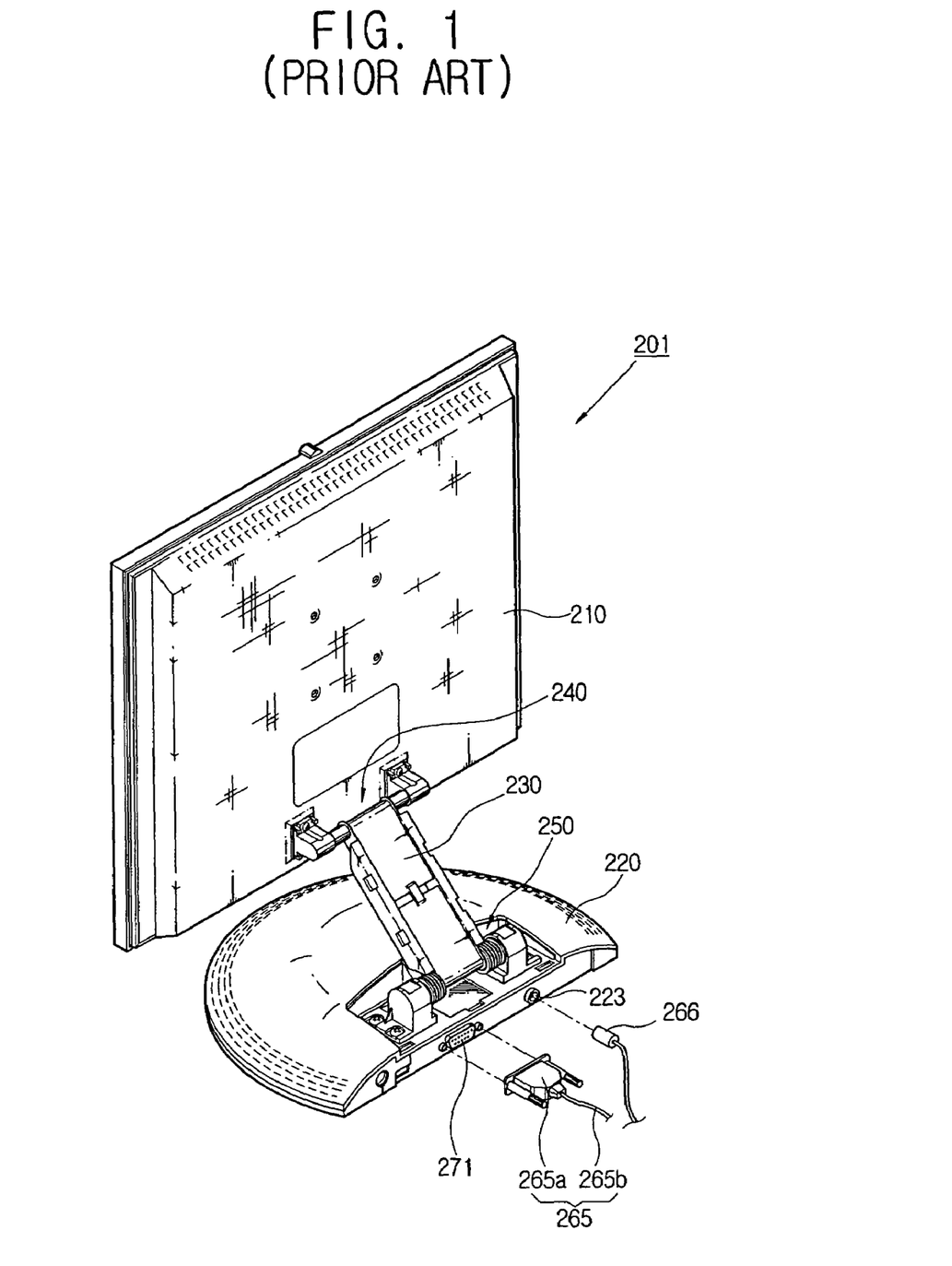
FIG. 1 is a rear perspective view of a conventional monitor.

As shown in FIG. 1, a conventional monitor 201 comprises a main body 210 displaying a picture; a base 220 supporting the main body 210; a link 230 provided between the main body 210 and the base 220; a monitor hinge 240 interposed between the main body 210 and the link 230, and pivotally supporting the main body 210 relative to the base 220; and a base hinge 250 interposed between the base 220 and the link 230, and pivotally supporting the base 220 relative to the link 230. To a back region of the base 220 are connected a data cable 265 having a connector 265a and a wire 265b and through which an external signal is transmitted, and a power cable 266 provided adjacent to the data cable 265 and through which external power is supplied to the monitor 201. Further, in the base 220 is provided a connection terminal 271 provided corresponding to the data cable 265 and connected with the data cable 265.

Here, the connection terminal 271 is connected with the data cable 265 through the connector 265a provided in the end of the data cable 265, thereby receiving the external signal such as a video signal, an audio signal, etc.

Thus, the conventional monitor 201 displays a picture with a sound by receiving the external signal through the connection terminal 271 connected with the data cable 265.

However, the conventional monitor 201 has a structure that the connector 265a of the data cable 265 is exposed externally when the data cable 265 is connected, so that an outer appearance of the monitor 201 is deteriorated. Further, when the monitor 201 is seated on a horizontal surface, the connector 265a makes the monitor 201 occupy a relatively large space.

SUMMARY OF THE INVENTION

Accordingly, it is an aspect of the present general inventive concept to provide a monitor that has a cool outer appearance and occupies a relatively small space.

Additional aspects and/or advantages of the general inventive concept will be set forth in part in the description which follows and, in part, will be obvious from the description, or may be learned by practice of the general inventive concept.

The foregoing and/or other aspects of the present general inventive concept are achieved by providing a monitor having a main body displaying a picture, and a base supporting the main body, the monitor comprising a link provided between the main body and the base; a monitor hinge interposed between the main body and the link, and pivotally supporting the main body relative to the base; a base hinge interposed between the base and the link, and pivotally supporting the base relative to the link; a cable having a first portion accommodated inside the link and a second portion exposed externally to transmit an external signal there throught; and a terminal assembly provided inside the link, and having a connection terminal to which the cable is connected, and a connection terminal supporter supporting the connection terminal.

According to another embodiment of the present invention, the monitor further comprises a front casing and a rear casing respectively placed in a front portion and a rear portion of the link, and forming an outer appearance, wherein on the front casing or the rear casing is formed an opening to communicate with the inside of the link.

According to yet another embodiment of the present invention, the opening is formed in the front casing, a cover detachably coupled to the opening and opening/closing the opening, and a terminal hinge provided inside the link and pivotally supporting the terminal assembly relative to the link.

According to yet another embodiment of the present invention, inside the link is provided a terminal assembly supporter to support the terminal assembly.

According to yet another embodiment of the present invention, terminal assembly supporter is placed between the terminal assembly and the cable and formed with a connection terminal insertion portion thereon to which the connection terminal is inserted.

According to yet another embodiment of the present invention, the terminal hinge comprises a terminal hinge shaft formed in one of the terminal assembly supporter and the link, and a terminal hinge shaft holder formed in the other one of the terminal assembly supporter and the link and rotatably holding the terminal hinge shaft.

According to yet another embodiment of the present invention, in a front of the base is provided a link accommodating portion to accommodate the link, and in a back thereof is provided a through portion through which the second portion of the cable passes.

According to another embodiment of the present invention, the monitor further comprises a pivoting hinge having a first portion positioned on a rear portion of the main body and a second portion connected to the link to allow the main body to be pivoted with respect to the link about an axis extending from a front portion to a rear portion of the main body.

According to another embodiment of the present invention, first portion of the pivoting hinge is a monitor bracket and the second portion of the pivoting hinge is a pivoting bracket provided between the monitor bracket and the monitor hinge and pivotally coupled to the monitor bracket.

According to yet another embodiment of the present invention, the link is provided in an H-shape and has a hollow inner portion to accommodate the data cable and the terminal assembly.

According to still another embodiment of the present invention, the link comprises first and second rods extending along the lengthwise direction of the link to provide interlock tilting of the main body with respect to the base.

According to another embodiment of the present invention, a monitor having a main body to display a picture, and a base to support the main body, the monitor comprises a link pivotally connected at one end with the main body and at another end with the base so that each of the main body and the base pivot independent of each other and with respect to each other, the link having an opening at a front side thereof; and a terminal assembly supporter provided inside the link and supporting a terminal assembly to which cables can be connected from an external source.

According to still another embodiment of the present invention, the monitor further comprises a terminal hinge extending from the terminal assembly supporter to opposite sides of the link such that the terminal assembly supporter and the terminal assembly rotate together to face towards the opening of the link to enable the cables to be connected and disconnected to the terminal assembly through the opening in the link.

According to another embodiment of the present invention, the monitor further comprises a terminal hinge extending from opposite sides of the terminal assembly to opposite sides of the link, respectively, such that the terminal assembly supporter and the terminal assembly rotate together to face towards the opening of the link to enable the cables to be connected and disconnected to the terminal assembly through the opening in the link.

According to yet another embodiment of the present invention, further comprises a cover that is removably connectable to the opening in the link.

According to another embodiment of the present invention, a monitor having a main body to display a picture, and a base to support the main body, the monitor comprises a hollow portion pivotally connected at one end with the main body and at another end with the base so that each of the main body and the base pivot with respect to the hollow portion and each other, the hollow portion having a terminal assembly therein and an opening at a front side thereof to expose the terminal assembly; and a terminal hinge extending from two inner sides of the hollow portion to respective opposite sides of the terminal assembly to allow one end of the terminal assembly to rotate towards the opening of the hollow portion.

According to still another embodiment of the present invention, the base comprises at least one through portion in which the cables can pass through when connected to the connection terminal.

BRIEF DESCRIPTION OF THE DRAWINGS

These and other aspects and advantages of the present general inventive concept will become apparent and more readily appreciated from the following description of the embodiments, taken in conjunction with the accompany drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 2:
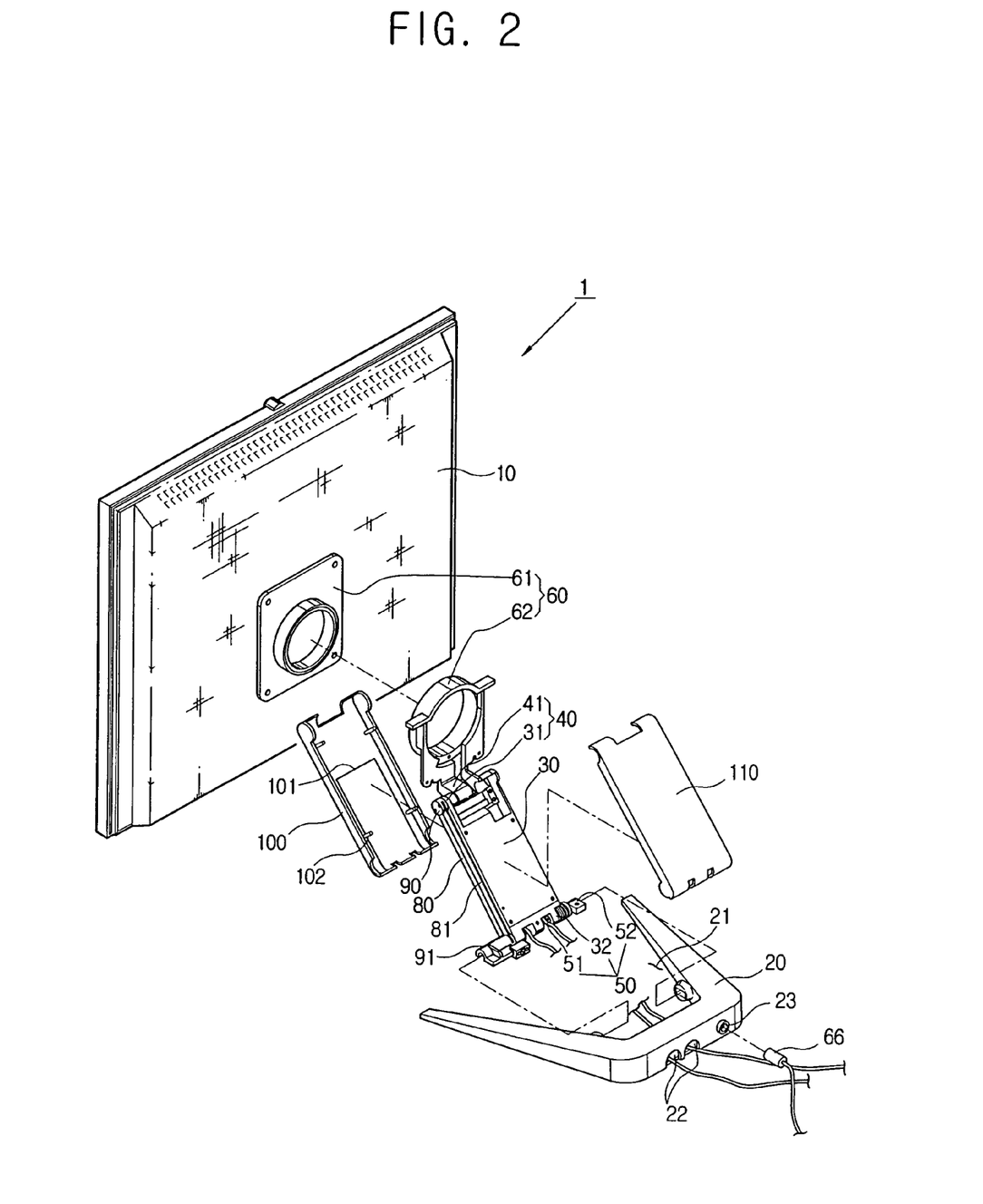
FIG. 2 is an exploded rear perspective view of a monitor according to an embodiment of the present general inventive concept.
Figure 3:
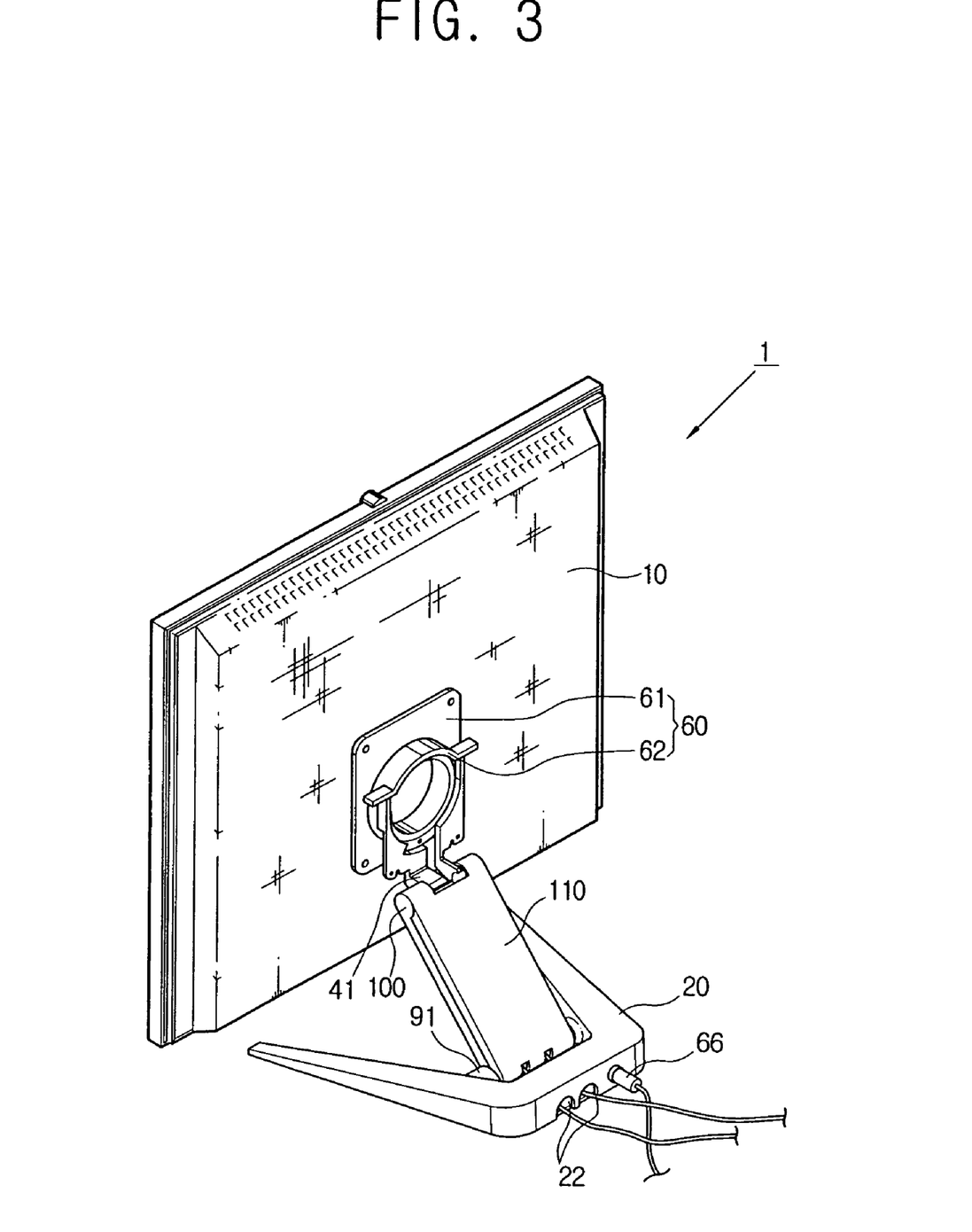
FIG. 3 is an assembled rear perspective view of the monitor of FIG. 2.
Figure 4:
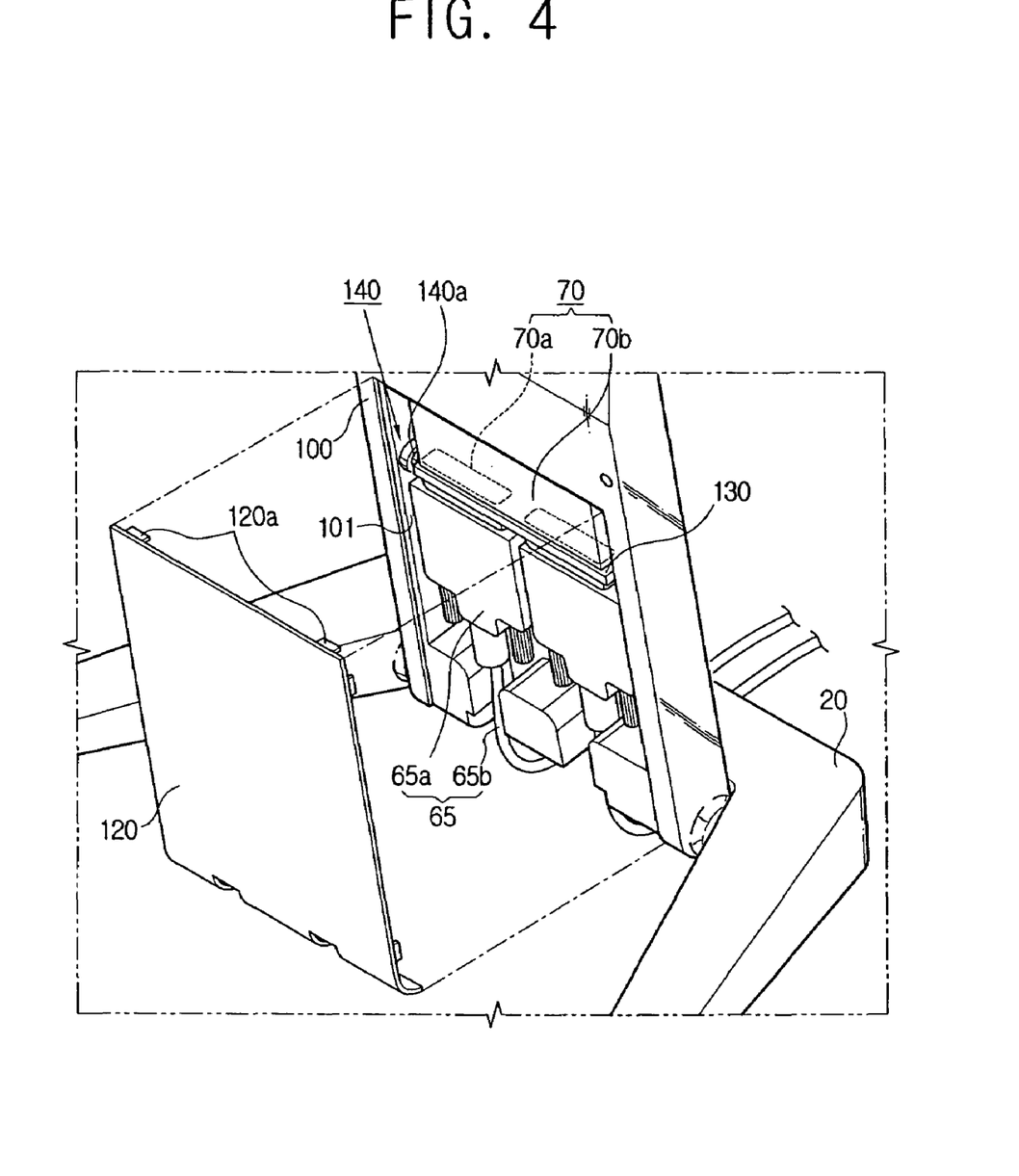
FIG. 4 is a partially enlarged front perspective view of the monitor of FIG. 2.

As shown in FIGS. 2 through 4, a monitor 1 according to an embodiment of the present general inventive concept may include a main body 10 displaying a picture; a base 20 supporting the main body 10; a link 30 provided between the main body 10 and the base 20; a monitor hinge 40 interposed between the main body 10 and the link 30, and pivotally supporting the main body 10 relative to the base 20; a base hinge 50 interposed between the base 20 and the link 30, and pivotally supporting the base 20 relative to the link 30; a data cable 65 having a first portion accommodated in the link 30 and a second portion exposed externally so as to transmit an external signal; and a terminal assembly 70 provided inside the link 30 and connected with the data cable 65.

On the rear of the main body 10 may be provided a pivoting hinge 60 allowing the main body 10 to be pivoted relative to the link 30 about an axis extending from a front portion to a rear portion of the main body.

The pivoting hinge 60 comprises a monitor bracket 61 coupled to the main body 10, and a pivoting bracket 62 provided between the monitor bracket 61 and the monitor hinge 40 and pivotally coupled to the monitor bracket 61.

In a front portion of the base 20 there may be provided a link accommodating portion 21 to accommodate the link 30, and in a back portion thereof there may be provided a through portion 22 through which the second portion of the data cable 65 passes. Further, in the back portion of the base 20 there may be provided a power connection portion 23 disposed adjacent to the through portion 22 and to which a power cable 66 supplying power to the monitor 1 may be connected.

The link accommodating portion 21 may allow the link 30 to be tilted relative to the base hinge 50 by a predetermined angle and accommodated therein. Thus, because the link 30 can be accommodated in the link accommodating portion 21, maximum carrying capacity is increased when the monitor 1 of FIG. 2 is packaged and carried, thereby reducing a physical distribution cost.

The link 30 approximates an "H"-shape and may have a hollow inner portion preferably having enough space to accommodate the data cable 65 and the terminal assembly 70. Further, the link 30 may be provided with a terminal assembly supporter 130 provided in the link 30 and supporting the terminal assembly 70. In upper and lower ends of the link 30 there may be provided an upper supporter 31 and a lower supporter 32 extending there from to accommodate and support a monitor hinge shaft (not shown) and a base hinge shaft 51 (to be described later), respectively. Further, in the upper and lower portions of the link 30 there may be provided an upper coupling bracket 90 and a lower coupling bracket 91, which may be coupled to a first rod 80 and a second rod 81 (to be described later), respectively.

The upper and lower supporters 31 and 32 may be formed with a monitor hinge shaft through hole (not shown) to which the monitor hinge shaft passes, and a base hinge shaft through hole to which the base hinge shaft 51 passes, respectively.

The terminal assembly supporter 130 may be disposed between the terminal assembly 70 and the data cable 65, and may be penetratingly formed with a connection terminal insertion portion (not shown) thereon to which a connection terminal 70a is inserted.

The monitor hinge 40 may include a monitor hinge bracket 41 coupled to the pivoting bracket 62, the monitor hinge shaft coupled to the monitor hinge bracket 41 and allowing the main body 10 to be tilted relative to the link 30, and the upper supporter 31 partially holding the monitor hinge shaft.

The monitor hinge shaft may include a first end formed with the upper coupling bracket 90 to which the first and second rods 80 and 81 are coupled, and a second end coupled to the monitor hinge bracket 41 via the monitor hinge shaft through hole of the link 30.

Symmetrically to the monitor hinge 40, the base hinge 50 may include a base hinge bracket 52 coupled to the base 20, the base hinge shaft 51 coupled to the base hinge bracket 52 and allowing the base 20 to be tilted relative to the link 30, and the upper supporter 32 partially holding the base hinge shaft 51.

The monitor 1 may include the first rod 80 and the second rod 81, which are disposed along a lengthwise direction of the link 30 and provides interlock tilting of the main body 10 with respect to the base 20.

Each of the first and second rods 80 and 81 may have a first end coupled to the upper coupling bracket 90 provided in the first end of the monitor hinge shaft, and a second end coupled to the lower coupling bracket 91.

The data cable 65 may be a pair of cables provided to transmit digital/analog signals, and may have a connector 65a connected to the connection terminal 70a of the terminal assembly 70 and a wire 65b connected to an external device.

In this embodiment, the wire 65b is connected to an external device through the through portions 22 penetratingly formed in the back of the base 20.

The terminal assembly 70 is coupled to an upper portion of the terminal assembly supporter 130, and includes the connection terminal 70a to which the connector 65a of the data cable 65, and a terminal assembly supporter 70b supporting the connection terminal 70a.

Meanwhile, the monitor 1 may include a terminal hinge 140 supporting the terminal assembly 70 to be pivoted toward an opening 101 at a predetermined angle.

The terminal hinge 140 may include a terminal hinge shaft formed at opposite sides of the terminal assembly supporter 130, and a terminal hinge shaft holder formed inside the link 30 and holding the terminal hinge shaft. Thus, the terminal assembly 70 can be forward tilted by the terminal hinge 140 so that the connector 65a of the data cable 65 can be easily attached to and detached from the connection terminal 70a.

Further, the monitor 1 may include a front casing 100 and a rear casing 110 respectively placed in a front portion and a rear portion of the link 30 and forming an outer appearance.

In a rear of the front casing 100 there may protrude coupling bosses 102 to be coupled to the rear casing 110, and in a front of the rear casing 110 there may be formed boss grooves (not shown) to insert the coupling bosses 102 therein. Further, in the front of the front casing 100 there may be formed an opening 101 allowing the cable 65 to communicate with the inside of the link 30.

Further, the monitor 1 may include a cover 120 detachably coupled to the opening 101 and opening/closing the opening 101. Thus, a user may open and close the cover 120 relative to the opening 101 so that the user can easily connect the connector 65a of the cable 65 to the terminal assembly 70 and remove it there from.

The cover 120 may approximate an "L"-shape, and may have a front portion shaped corresponding to the shape of the opening 101, and a bottom portion bent backward from the front portion and coupled to the bottom of the link 30.

In upper and lateral sides of the cover 120 are formed coupling projections 120a to be coupled to the front casing 100, wherein the coupling projections 120a may be inserted in projection grooves (not shown) formed in the front casing 100.

With this configuration of the monitor according to this embodiment, an operation of replacing the data cable 65 with another cable is performed as follows.

Figure 5:
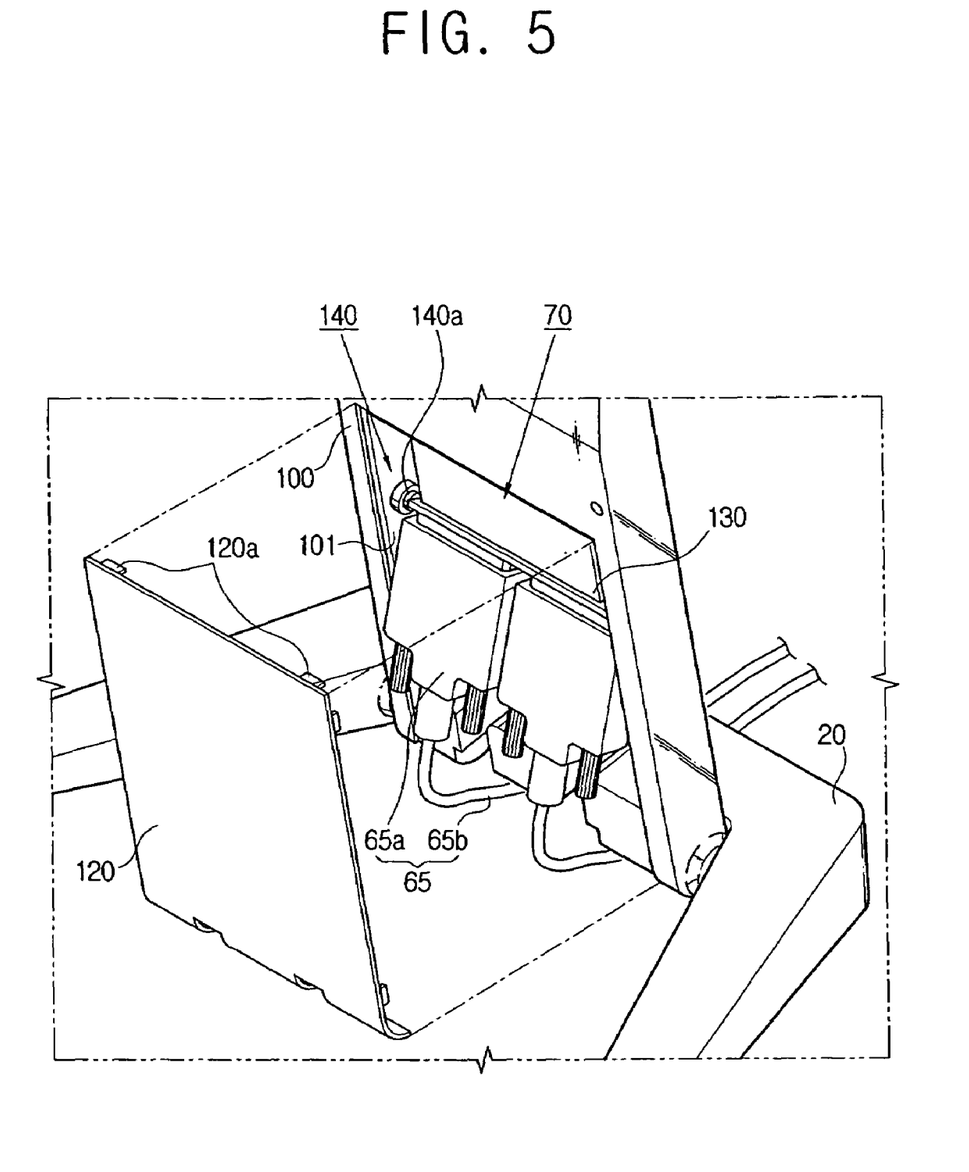
FIG. 5 is a partially enlarged front perspective view illustrating a pivoted state of a terminal assembly supporter of FIG. 4.

As shown in FIG. 5, to change the data cable 65, a user first removes the cover 120 from the front casing 100. Thereafter, to facilitate the detachment of the connector 65a connected to the terminal assembly 70, the terminal assembly supporter 130 is forward tilted by a predetermined angle with respective to the terminal hinge 140. Then, the connector 65a is separated from the terminal assembly 70 tilted at a predetermined angle, and is taken out via the opening 101. Thereafter, another cable is connected to the terminal assembly 70 and the terminal assembly supporter 130 is tilted toward the inside of the link 30. Finally, a user covers the opening 101 with the cover 120, thereby completing the replacement of the data cable 65.

Thus, because the terminal assembly 70 and the data cable 65 are accommodated and connected inside the link 30, space utilization of the monitor 1 is enhanced. Further, the opening 101 is provide to communicate with the inside of the link 30, thereby facilitating the replacement of the data cable 65 accommodated inside the link 30.

In the foregoing embodiment, the opening 101 is illustrated as being provided in the front casing 100, but may be provided in the rear casing 110.

In the foregoing embodiment, the terminal assembly supporter 130 is illustrated as being provided under the terminal assembly 70 and supports the terminal assembly 70. However, the terminal assembly 130 may have a structure to be coupled to an upper or lateral portion of the terminal assembly 70 so as to support the terminal assembly 70.

In the foregoing embodiment, the terminal hinge 140 is described as including the terminal hinge shaft provided in the terminal assembly supporter 130, and the terminal hinge shaft holder formed inside the link 30. However, the terminal hinge shaft holder may be formed in the terminal assembly supporter 130, and the terminal hinge shaft 140 may be provided in the link 30.

Figure 6:
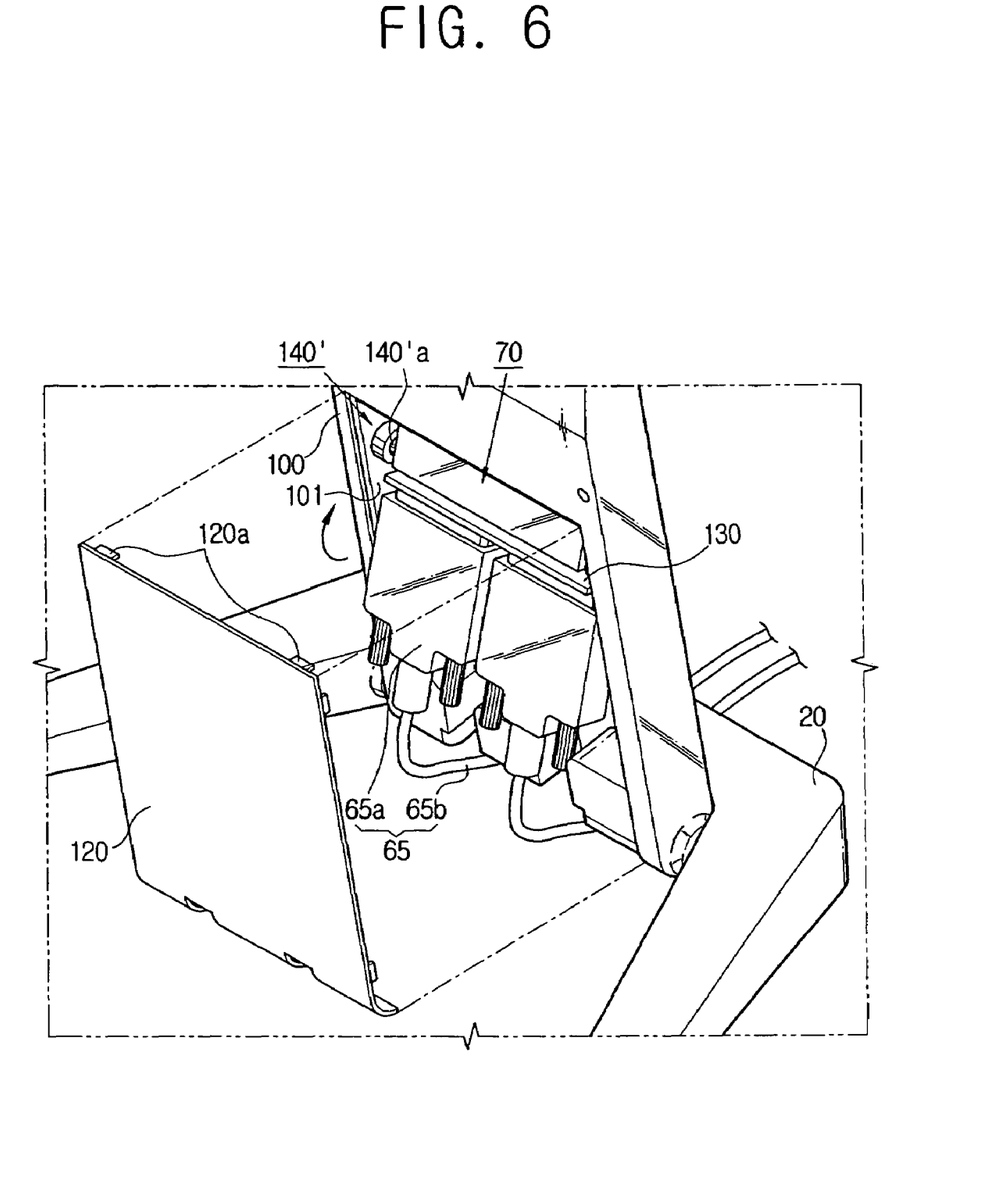
FIG. 6 is a partially enlarged front perspective view illustrating a pivoted state of a terminal assembly supporter according to another embodiment of the present general inventive concept.

In the foregoing embodiment, the terminal hinge shaft 140a of the terminal hinge 140 is described as being provided at the opposite sides of the terminal assembly supporter 130. However, as shown in FIG. 6, the terminal hinge shaft 140'a can be provided at the opposite sides of the terminal assembly 70. In this case, the terminal assembly supporter 130 does not substantially support the terminal assembly 70, so that it does not matter from an economic point of view whether the terminal assembly supporter 130 is removed.

As described above, the present general inventive concept provides a monitor in which a terminal assembly and a cable are accommodated inside a link, thereby enhancing space utilization and providing a cool outer appearance.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A monitor having a main body displaying a picture, and a base supporting the main body, the monitor comprising:
    a link provided between the main body and the base;
    a monitor hinge interposed between the main body and the link, and pivotally supporting the main body relative to the base;
    a base hinge interposed between the base and the link, and pivotally supporting the base relative to the link;
    a cable having a first portion accommodated inside the link and a second portion exposed externally to transmit an external signal there throught; and
    a terminal assembly provided inside the link, and having a connection terminal to which the cable is connected, and a connection terminal supporter supporting the connection terminal.

2. The monitor according to claim 1, further comprising a front casing and a rear casing respectively placed in a front portion and a rear portion of the link, and forming an outer appearance, wherein on the front casing or the rear casing is formed an opening to communicate with the inside of the link.

3. The monitor according to claim 2, wherein the opening is formed in the front casing.

4. The monitor according to claim 3, further comprising a cover detachably coupled to the opening and opening/closing the opening.

5. The monitor according to claim 4, wherein inside the link is provided a terminal assembly supporter to support the terminal assembly.

6. The monitor according to claim 5, wherein the terminal assembly supporter is placed between the terminal assembly and the cable and formed with a connection terminal insertion portion thereon to which the connection terminal is inserted.

7. The monitor according to claim 5, further comprising a terminal hinge provided inside the link and pivotally supporting the terminal assembly relative to the link.

8. The monitor according to claim 7, wherein the terminal hinge comprises a terminal hinge shaft formed in one of the terminal assembly supporter and the link, and a terminal hinge shaft holder formed in the other one of the terminal assembly supporter and the link and rotatably holding the terminal hinge shaft.

9. The monitor according to claim 1, wherein in a front of the base is provided a link accommodating portion to accommodate the link, and in a back thereof is provided a through portion through which the second portion of the cable passes.

10. The monitor according to claim 1, further comprising a pivoting hinge having a first portion positioned on a rear portion of the main body and a second portion connected to the link to allow the main body to be pivoted with respect to the link about an axis extending from a front portion to a rear portion of the main body.

11. The monitor according to claim 10, wherein the first portion of the pivoting hinge is a monitor bracket and the second portion of the pivoting hinge is a pivoting bracket provided between the monitor bracket and the monitor hinge and pivotally coupled to the monitor bracket.

12. The monitor according to claim 1, wherein the link is provided in an H-shape and has a hollow inner portion to accommodate the data cable and the terminal assembly.

13. The monitor according to claim 1, wherein the link comprises:
    first and second rods extending along the lengthwise direction of the link to provide interlock tilting of the main body with respect to the base.

14. A monitor having a main body to display a picture, and a base to support the main body, the monitor comprising:
    a link pivotally connected at one end with the main body and at another end with the base so that each of the main body and the base pivot independent of each other and with respect to each other, the link having an opening at a front side thereof; and
    a terminal assembly supporter provided inside the link and supporting a terminal assembly to which cables can be connected from an external source.

15. The monitor according to claim 14, further comprising a terminal hinge extending from the terminal assembly supporter to opposite sides of the link such that the terminal assembly supporter and the terminal assembly rotate together to face towards the opening of the link to enable the cables to be connected and disconnected to the terminal assembly through the opening in the link.

16. The monitor according to claim 15, further comprising a cover that is removably connectable to the opening in the link.

17. The monitor according to claim 14, further comprising a terminal hinge extending from opposite sides of the terminal assembly to opposite sides of the link, respectively, such that the terminal assembly supporter and the terminal assembly rotate together to face towards the opening of the link to enable the cables to be connected and disconnected to the terminal assembly through the opening in the link.

18. The monitor of claim 17, further comprising a cover that is removably connectable to the opening in the link.

19. A monitor having a main body to display a picture, and a base to support the main body, the monitor comprising:
    a hollow portion pivotally connected at one end with the main body and at another end with the base so that each of the main body and the base pivot with respect to the hollow portion and each other, the hollow portion having a terminal assembly therein and an opening at a front side thereof to expose the terminal assembly; and
    a terminal hinge extending from two inner sides of the hollow portion to respective opposite sides of the terminal assembly to allow one end of the terminal assembly to rotate towards the opening of the hollow portion.

20. The monitor according to claim 19, wherein the base comprises at least one through portion in which the cables can pass through when connected to the connection terminal.

* * * * *